(12) United States Patent
Sugizaki

(10) Patent No.: US 8,176,261 B2
(45) Date of Patent: May 8, 2012

(54) INFORMATION PROCESSING APPARATUS AND DATA TRANSFER METHOD

(75) Inventor: Go Sugizaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 514 days.

(21) Appl. No.: 12/230,109

(22) Filed: Aug. 22, 2008

(65) Prior Publication Data

US 2008/0320234 A1    Dec. 25, 2008

Related U.S. Application Data

(63) Continuation of application No. PCT/JP2006/303437, filed on Feb. 24, 2006.

(51) Int. Cl.
*G06F 13/20* (2006.01)
(52) U.S. Cl. ........ 711/143; 711/118; 711/141; 711/144; 711/145; 711/146
(58) Field of Classification Search .................. 711/118, 711/143, 146, 144, 145, 141
See application file for complete search history.

(56) References Cited

U.S. PATENT DOCUMENTS

| | | | | |
|---|---|---|---|---|
| 5,522,058 A * | 5/1996 | Iwasa et al. | ..................... | 711/145 |
| 7,571,285 B2 * | 8/2009 | Hughes et al. | ................. | 711/130 |
| 7,870,337 B2 * | 1/2011 | Bell et al. | ........................ | 711/118 |
| 2003/0233423 A1 * | 12/2003 | Dilley et al. | ................... | 709/214 |
| 2004/0073623 A1 * | 4/2004 | Benkual et al. | ................ | 709/213 |
| 2005/0044147 A1 * | 2/2005 | Yap | ................................ | 709/205 |
| 2005/0240735 A1 * | 10/2005 | Shen et al. | ..................... | 711/144 |
| 2007/0156963 A1 * | 7/2007 | Chen et al. | ..................... | 711/130 |

FOREIGN PATENT DOCUMENTS

| | | |
|---|---|---|
| JP | 5-100952 | 4/1993 |
| JP | 6-110844 | 4/1994 |
| JP | 6110844 | 4/1994 |
| JP | 8-95858 | 4/1996 |
| JP | 10-232825 | 9/1998 |
| JP | 2000-227908 | 8/2000 |
| JP | 2001-101147 | 4/2001 |
| JP | 2002-049600 | 2/2002 |

OTHER PUBLICATIONS

Japanese Office Action issued Apr. 3, 2009 in corresponding Japanese Patent Application 2008-501536.
International Search Report mailed Jun. 20, 2006, in connection with International Application No. PCT/JP2006/303437.

* cited by examiner

*Primary Examiner* — Jae Yu
(74) *Attorney, Agent, or Firm* — Fujitsu Patent Center

(57) ABSTRACT

One aspect of the embodiments utilizes an information processing apparatus having a plurality of system boards connected via a bus, each system board including a CPU having a cache memory, a main memory that forms a shared memory, and a system controller that manages the CPU and the main memory as well as controls a data transfer of at least one of the cache memory and the main memory by a memory access request, wherein each system controller including a snoop controller that selects a transfer source CPU from transfer source candidate CPUs each having cache memory including a data requested by the memory access request when the data is available in a plurality of cache memories.

4 Claims, 12 Drawing Sheets

| CACHE LINE INFORMATION | MAIN MEMORY INFORMATION | CACHE-LINE STATE INFORMATION |
|---|---|---|
| CML #A1 | – | I (INVALID) |
| CML #A2 | ADa | M (UPDATED AND EXCLUSIVE) |
| ⋮ | ⋮ | ⋮ |
| CML #B1 | ADb | S (SHARED) |
| CML #B2 | ADc | E (NON-UPDATED AND EXCLUSIVE) |
| CML #B3 | ADd | O (UPDATED AND OWNED) |
| ⋮ | ⋮ | ⋮ |

FIG.6

| STORING FORMAT | TRANSITION CONDITION |
|---|---|
| I→E | WHEN DATA IS COPIED TO CACHE LINE FROM MAIN MEMORY IN RESPONSE TO FETCH REQUEST |
| I→S | WHEN DATA IS COPIED TO CACHE LINE FROM OTHER CACHE MEMORY IN RESPONSE TO FETCH REQUEST |
| I→M | WHEN DATA IS COPIED TO CACHE LINE FROM OTHER CACHE MEMORY OR MAIN MEMORY IN RESPONSE TO STORE REQUEST, AND COPIED DATA IS CHANGED |
| I→O | WHEN, IN RESPONSE TO FETCH REQUEST, DATA IS COPIED FROM A CACHE LINE WITH STORING FORMAT OF SHARED (S) OR OWNED (O), AND IN ADDITION, WHEN PHYSICALLY CLOSER TO MAIN MEMORY THAT STORES COPIED DATA THAN TO OWNED (O) PRIOR TO COPYING. |
| E→M | WHEN DATA IN CACHE LINE IS CHANGED IN RESPONSE TO STORE REQUEST |
| E→S | WHEN DATA IS TRANSFERRED FROM OTHER CACHE MEMORY IN RESPOSNE TO FETCH REQUEST |
| E→I | WHEN CACHE LINE IS DISCARDED |
| S→M | WHEN DATA IN CACHE LINE IS CHANGED IN RESPONSE TO STORE REQUEST |
| S→I | WHEN DATA IN CACHE LINE OF OTHER CACHE MEMORY STORING DATA IDENTICAL TO CACHE LINE IS CHANGED IN RESPONSE TO STORE REQUEST |
| M→O | WHEN DATA IS TRANSFERRED TO OTHER CACHE MEMORY IN RESPONSE TO FETCH REQUEST, AND WHEN PHYSICALLY CLOSER TO MAIN MEMORY STORING DATA THAN TO TRANSFER DESTINATION CACHE MEMORY |
| M→I | WHEN DATA IS DISCARDED FROM CACHE LINE |
| M→S | WHEN DATA IS TRANSFERRED TO OTHER CACHE MEMORY IN RESPONSE TO FETCH REQUEST, AND WHEN PHYSICALLY FARTHER TO MAIN MEMORY STORING DATA THAN TO TRANSFER DESTINATION CACHE MEMORY |
| O→I | WHEN DATA IS DISCARDED FROM CACHE LINE |
| O→M | WHEN DATA IN CACHE LINE IS CHANGED IN RESPONSE TO STORE REQUEST |
| O→S | WHEN DATA IS TRANSFERRED TO OTHER CACHE MEMORY IN RESPONSE TO FETCH REQUEST, AND IN ADDITION, CACHE MEMORY IS PHYSICALLY FARTHER TO MAIN MEMORY STORING DATA THAN DESTINATION CACHE MEMORY |

INFORMATION PROCESSING APPARATUS AND DATA TRANSFER METHOD

This application is a continuing application, filed under 35 U.S.C. §111(a), of

International Application PCT/JP2006/303437, filed Feb. 24, 2006, the contents of which is incorporated herein by reference.

BACKGROUND OF THE INVENTION

1. Field of the Invention

The present invention relates to a data transfer method and an information processing apparatus having a multi processor structure with each processor having a cache memory.

2. Description of the Related Art

There are technologies, such as disclosed in Japanese Patent Application Laid-open No. 2001-101147, that enable high-speed data transfer between cache memories while preserving coherency between the cache memories in an information processing apparatus having a plurality of system boards with a plurality of central processing units (CPUs) each of which having a cache memory.

In Japanese Patent Application Laid-open No. 2001-101147, for example, when a plurality of devices (cache memories) have a transferrable data as data requested by a request source device (request source cache memory), the requested data is transferred to the request source cache memory from a cache memory that is logically nearest to the request source cache memory (for example, a cache memory that resides in the same node (system board), a cache memory in which the requested data is changed, or a most-recently selected cache memory).

Suppose that the conventional data transfer method described above is applied to an information processing apparatus that includes a plurality of CPUs each of which having cache memory, a plurality of input-output devices, a plurality of memory devices (main memories), and a plurality of system boards each of which having a system controller that manages the CPU, the input-output device, and the main memory. Here, the plurality of the system boards is connected to one another by a bus.

When the cache memories use a swap method and MOESI protocol as a cache protocol to preserve the coherency between the cache memories and when a requested data is available in the cache memory located on the same system board, the cache memory that is located on the same system board is selected. Consequently, the bus that connects the system boards is not required for the data transfer.

However, the conventional technology does not take into account the type of memory access request and/or the relation between the cache memory and the main memory. Hence, data transfer from the cache memory to the main memory could not be improved during write-back.

SUMMARY

According to an aspect of the invention, an information processing apparatus having a plurality of system boards connected via a bus, each system board including a CPU having a cache memory, a main memory that forms a shared memory, and a system controller that manages the CPU and the main memory as well as controls a data transfer of at least one of the cache memory and the main memory by a memory access request, wherein each system controller including a snoop controller that selects a transfer source CPU from transfer source candidate CPUs each having cache memory including a data requested by the memory access request when the data is available in a plurality of cache memories.

BRIEF DESCRIPTION OF THE DRAWINGS

FIG. 6 is a tabular representation of transition condition in the state transition diagram shown in FIG. 5;

DETAILED DESCRIPTION OF THE PREFERRED EMBODIMENTS

Exemplary embodiments of the information processing apparatus and the data transfer method according to the present invention are described below with reference to the accompanying drawings. The invention is not to be limited to the embodiments described hereinafter.

Figure 1:
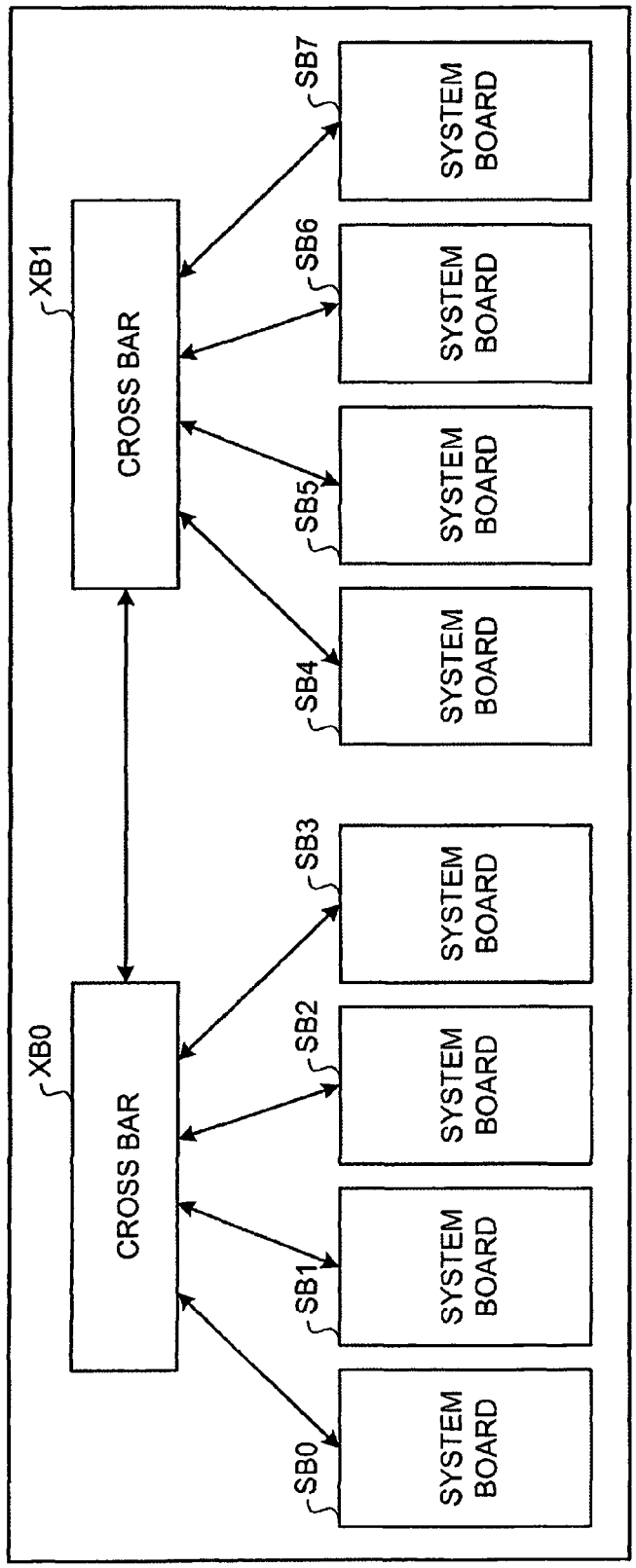
FIG. 1 is a block diagram of an information processing apparatus according to an embodiment of the present invention.
Figure 2:
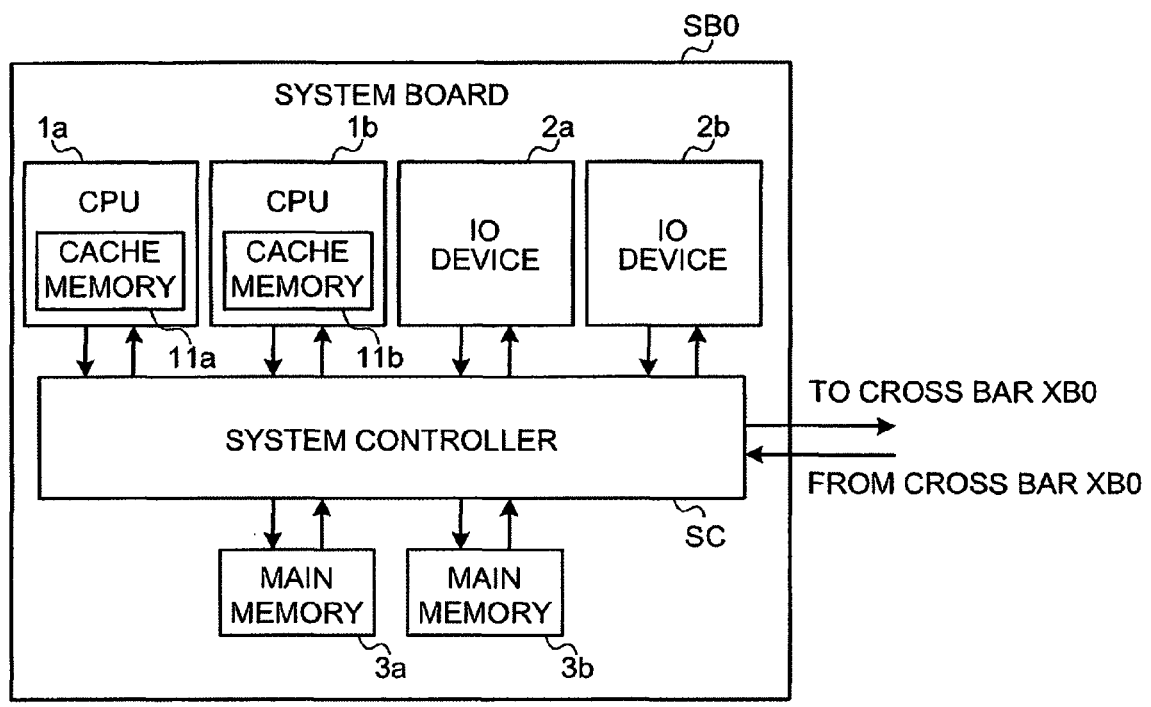
FIG. 2 is a block diagram of a system board shown in FIG. 1.

An information processing apparatus according to an embodiment of the present invention is described with reference to FIGS. 1 to 12. FIG. 1 is a block diagram of the information processing apparatus. The information processing apparatus shown in FIG. 1 includes system boards SB0 to SB3 that are each connected to a cross bar XB0 and system boards SB4 to SB7 that are each connected to a cross bar XB1. The system boards SB0 to SB3 perform data transfer thereamong via the cross bar XB0, and the system boards SB4 to SB7 perform data transfer thereamong via the cross bar XB1. Data transfer between at least one of the system boards SB0 to SB3 and at least one of the system boards SB4 to SB7 is performed via both of the cross bars XB0 and XB1.

Each of the system boards SB0 to SB7 has identical functions. Hereinafter, functions of the system board are explained with reference to a block diagram of the system board SB0 shown in FIG. 2. The system board SB0 includes a CPU 1a having a cache memory 11a, a CPU 1b having a cache memory 11b, input-output devices (hereinafter, referred to as IO devices) 2a and 2b, main memories 3a and 3b, and a system controller SC.

The main memory 3 (corresponding to main memory 3a and/or 3b) is configured by a memory device having a storage capacity larger than that of the cache memory 11 (corresponding to cache memory 11a and/or 11b) but having an access speed slower than that of the cache memory 11. The main memory 3 is used as a shared memory of the information processing apparatus, and stores data including a program that is to be run by the CPU 1 (corresponding to CPU 1a and/or 1b) of the system boards SB0 to SB7.

The cache memory 11 is configured by a memory device having a storage capacity smaller than the main memory 3 but having an access speed faster than the main memory 3. The cache memory 11 stores therein some of the data stored in the main memory 3 acquired by data transfer between the cache memories 11 or between the main memory 3 and the cache memory 11 in response to the memory access request issued by the CPU 1. Here, the cache memory 11 employs a swap method to store the data.

The system controller SC manages the CPUs 1, the IO devices 2 (corresponding to IO device 2a and/or 2b), and the main memories 3 provided on the system board SB0 to which the system controller SC belongs. The system controller SC also manages the state of the cache memories 11 in the CPUs 1 based on a predetermined cache protocol such as MOESI protocol so as to preserve the coherence between the cache memories 11, and controls data transfer between the cache memories 11 and the data transfer between the cache memory 11 and the main memory 3.

Figure 3:
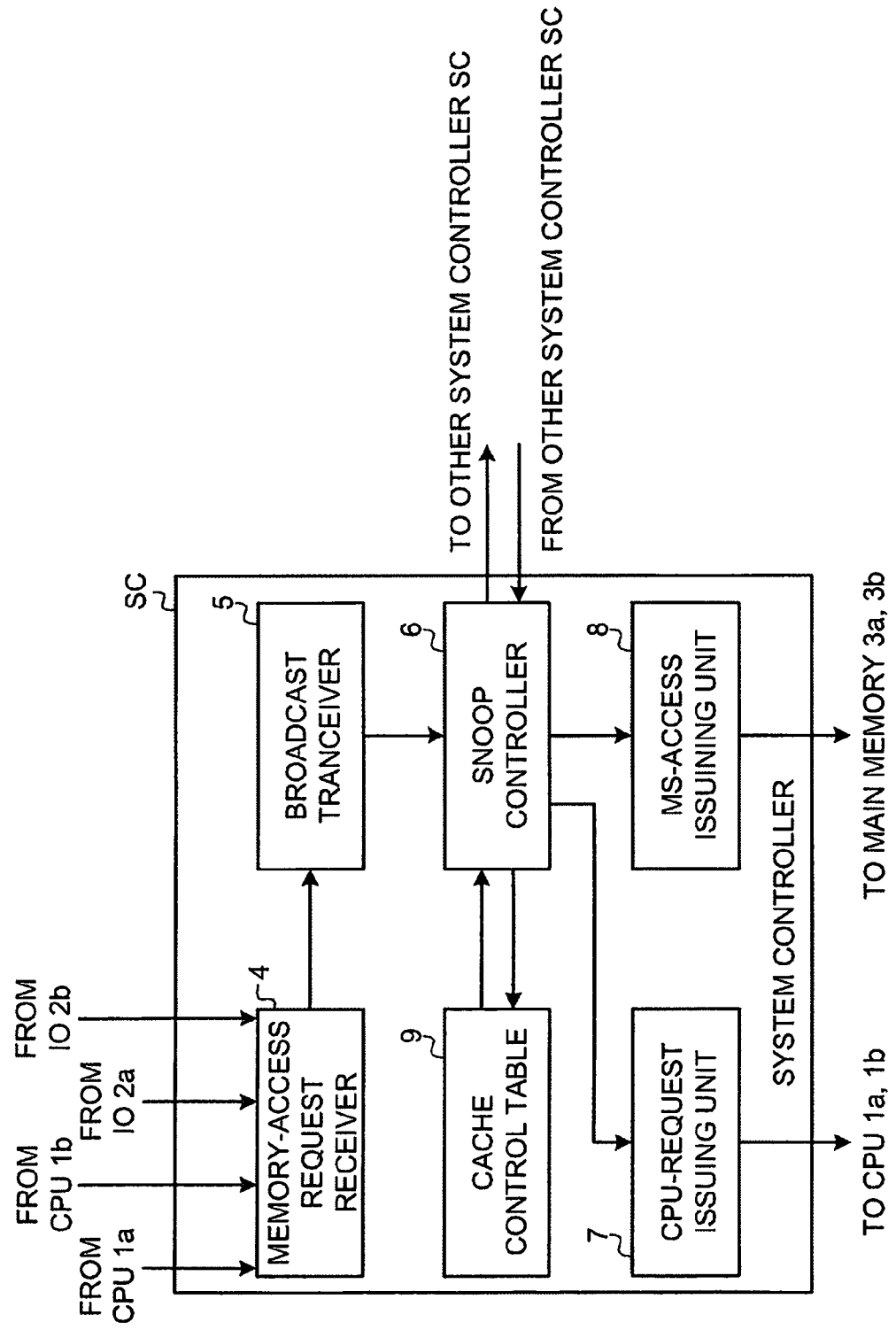
FIG. 3 is a block diagram of a system controller shown in FIG. 2.

FIG. 3 is a block diagram of the system controller SC when initiating a memory access process during the data transfer in response to the memory access request from the CPU 1 or the IO device 2. As shown in FIG. 3, the system controller SC includes a memory-access-request receiver 4, a broadcast transceiver 5, a snoop controller 6, a CPU-request issuing unit 7, an MS-access issuing unit 8, and a cache control table 9.

The state of the cache memory 11 of the CPU 1 managed by the system controller SC to which the cache control table 9 belongs is registered in the cache control table 9. The registered state of the cache memory 11 is used to determine whether the data requested by the memory access request is available in the cache memory 11.

The data transfer between the cache memories 11 and the data transfer from the cache memory 11 to the main memory 3 takes place by cache line, whereas the data transfer from the main memory 3 to the cache memory 11 takes place by entry. The relation between an entry byte count and a cache-line byte count is predetermined, and satisfies "entry byte count=cache–line byte count×n," where n is a natural number. Hence, the state of the cache memory 11 is managed by cache line.

Figures 4, 5:
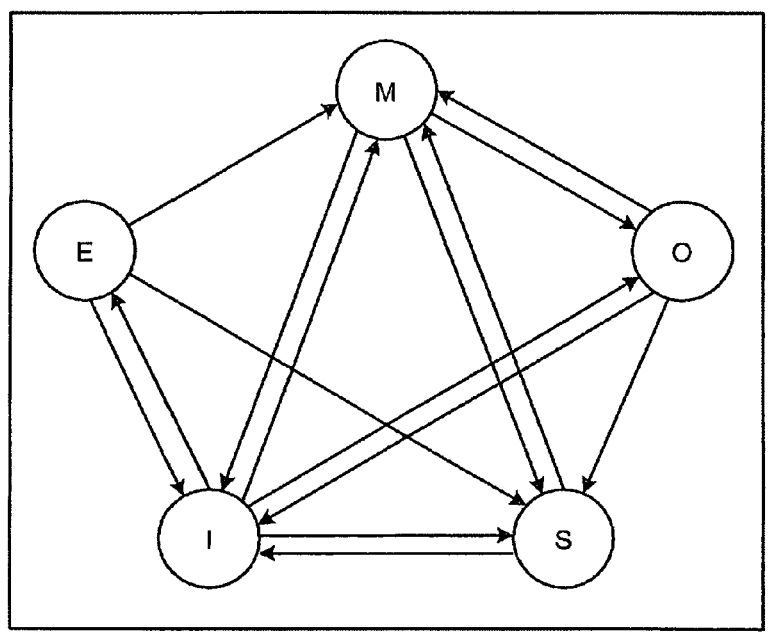
FIG. 4 shows a structure of a cache manage table shown in FIG. 3.
FIG. 5 is a state transition diagram of a transition state of data in a cache memory shown in FIG. 2.

FIG. 4 shows one example of a structure of the cache control table 9. As shown in FIG. 4, the cache control table 9 includes main memory information and cache-line state information that are associated with sub-block information in which cache line ID (identification) identifying the cache line of the cache memories 11a and 11b is registered. Here, the main memory information indicates the association between the data stored in the cache line and the data in the main memory 3. The cache-line state information indicates the state (register format) of the data stored in the cache line.

Returning to FIG. 3, the memory-access-request receiver 4 receives the memory access request issued by the CPU 1 and the IO device 2 managed by the system controller SC to which the memory-access-request receiver 4 belongs, and outputs the received memory access request to the broadcast transceiver 5.

The broadcast transceiver 5 includes a communication interface for communication between system controllers SC. Further, the broadcast. transceiver 5 transmits the memory access request input from the memory-access-request receiver 4 to the system controllers SC of the other system boards SB1 to SB7 as well as outputs the memory access request to the snoop controller 6. The broadcast transceiver 5 also receives a memory access request from the system controllers SC of other system boards SB1 to SB7, and outputs the memory access request to the snoop controller 6. In other words, the broadcast transceiver 5 broadcasts the memory access request issued by the CPU 1 and the IO device 2 managed by the system controller SC to which the broadcast transceiver 5 belongs to the snoop controllers 6 of the system controllers SC of all the system boards SB0 to SB7.

Upon receiving the memory access request, the snoop controller 6 detects the cache line state of the cache memory 11 in the CPU 1 managed by the system controller SC to which the snoop controller 6 belongs (that is, detects whether the data requested by the memory access request is available in the cache line of the cache memory 11), and also detects the state of the resource to be used for data transfer (that is, control bus, address bus, and data bus, such as chip select signal or read-write control signal for the cache memory 11), to perform a snoop process. In the snoop process, the snoop controller 6 selects the status of each cache memory 11 for the data requested by the memory access request (target data).

The snoop controller 6 then notifies the other snoop controllers 6 of the status selected for each cache memory 11 in the snoop process, as a snoop process result. The snoop controller 6 then merges statuses of all the cache memories 11 in the information processing apparatus to determine a final status, and performs a memory-access initiation process based on the final status. Here, the memory-access initiation process initiates a memory access process for the data transfer either between two cache memories 11 or between the cache memory 11 and the main memory 3. In addition, the snoop controller 6 updates a register format that is registered in the cache-memory state information in the cache control table 9.

Types of status selected and a condition for the selection of the status in the snoop process performed by the snoop controller 6 are described below. The snoop controller 6 selects three types of status, namely, 'BUSY,' 'HIT,' and 'MISS.' The 'BUSY' status indicates that it cannot be determined currently whether the target data corresponding to the memory access request is available in the cache memory 11. That is to say, the snoop controller 6 selects the 'BUSY' status when the target data competes with a target data corresponding to a prior memory access request (that is, when the target data corresponding to the target memory access request and the target data corresponding to the prior memory access request reside in the same cache line), or when there is resource depletion. Here, the prior memory access request is used for the memory-access initiation process and the memory access process, and the prior memory access request has been issued prior to the target memory access request. Resource depletion corresponds to a state when the cache memory 11 has been accessed by the memory access process of the prior memory access request so that the target data cannot be accessed by the target memory access request.

The 'HIT' status indicates that the target data corresponding to the target memory access request is available for use in the cache memory 11. The snoop controller 6 selects the 'HIT' status when the target data corresponding to the target memory access request does not compete with the target data corresponding to the prior memory-access request, and additionally, when there is no resource depletion (when not in 'BUSY' status), and further additionally, when the target data corresponding to the target memory access request is available in a sub-block of the cache memory 11.

The 'MISS' status indicates that the data needs to be transferred from the main memory 3. The snoop controller 6 selects the 'MISS' status when the target data corresponding to the target memory access request does not compete with the prior memory access request, and additionally, when there is no resource depletion (not in 'BUSY' status), and further additionally, when the target data corresponding to the target memory access request is not available in the sub-block of the cache memory 11.

After completing the snoop process in which the snoop controller 6 selects one of the three types of status 'BUSY,' 'HIT,' and 'MISS' for each cache memories 11 in the CPU 1 managed by the system controller SC to which the snoop controller 6 belongs, the snoop controller 6 notifies the other snoop controllers 6 of the status of each cache memory 11, as the snoop process result. The snoop controller 6 then merges the statuses of all the cache memories 11 included in the information processing apparatus acquired by the snoop controller 6 and other snoop controllers 6 to determine a final status.

Specifically, when all of the statuses are 'BUSY,' the snoop controller 6 selects 'BUSY' as the final status. When there is no 'BUSY' status but there is a 'HIT' status, the snoop controller 6 selects 'HIT' as the final status. When there is no 'BUSY' status and 'HIT' status, that is, when all of the statuses are 'MISS,' the snoop controller 6 selects 'MISS' as the final status.

If the final status is 'BUSY,' the snoop controller 6 repeats the snoop process until the final status becomes one of 'HIT' and 'MISS.' If the final status is 'HIT,' the snoop controller 6 initiates the memory access process requesting the data transfer to one of the cache memories 11 with a 'HIT' status.

Specifically, the snoop controller 6 selects a CPU 1 having a minimum physical distance to the request source CPU 1 from the CPUs 1 each having the cache memory 11 with a 'HIT' status. Here, the physical distance between the CPUs 1 corresponds to a route length of the bus used for the data transfer. Hence, the CPUs 1a and 1b that are provided on the same system board are considered physically the closest. The CPU 1 provided on one of the system boards SB0 to SB3 and the CPU 1 provided on other one of the system boards SB0 to SB3, or the CPU 1 provided on one of the system boards SB4 to SB7 and the CPU 1 provided on other one of the system boards SB4 to SB7 are considered the next closest. Here, the one of the system boards SB0 to SB 3 and the other one of the system boards SB0 to SB3 are connected via the cross bar XB0, and the one of the system boards SB4 to SB7 and the other one of the system boards SB4 to SB7 are connected to each other via the cross bar XB1. The CPU 1 provided on one of the system boards SB0 to SB3 and the CPU 1 provided on one of the system boards SB4 to SB7 are considered physically the farthest. Here, the one of the system boards SB0 to SB3 and the other one of the system boards SB4 to SB7 are connected to each other via the cross bars XB0 and XB1.

Each of the system boards SB0 to SB7 on which the CPUs 1a and 1b that are the request source are provided is pre-assigned with a physical number, and the snoop controller 6 attaches to the memory access request the pre-assigned physical number of the system board SB0 to SB7. The snoop controller 6 also attaches to the snoop process result the physical number of the system board SB0 to SB7 to which the snoop controller 6 belongs. Accordingly, the snoop controller 6 determines the physical distance between the CPUs 1 based on the physical number included in the memory access request and the physical number included in the snoop process result, and selects the CPU 1 that is physically closest to the CPU 1 that has issued the memory access request. Here, the snoop controller 6 can be configured so as to select one CPU 1 in a predetermined sequence when the statuses of both the cache memory 11a of the CPU 1a and the cache memory 11b of the CPU 1b belonging to the same system board SB0 to SB7 are 'HIT.'

If the CPU 1 selected by the snoop controller 6 is managed by the system controller SC to which the snoop controller 6 belongs, the snoop controller 6 initiates the memory access process in which the snoop controller 6 issues a request for data transfer from the cache memory 11.

If the final status is 'MISS,' and the memory access request is a fetch request (shared fetch request for data browsing or exclusive fetch request for data update), the snoop controller 6 initiates the memory access process in which the snoop controller 6 issues a request to read the target data from the main memory 3.

Specifically, the snoop controller 6 determines, based on the address included in the shared fetch request or exclusive fetch request and based on the address space assigned in the main memory 3, whether the main memory 3 that contains the target data corresponding to the shared fetch request or exclusive fetch request is managed by the system controller SC to which the snoop controller 6 belongs. When the main memory 3 that contains the target data is managed by the system controller SC to which the snoop controller 6 belongs, the snoop controller 6 requests the data transfer with respect to the main memory 3 to initiate the memory access process.

When the final status is 'MISS' and when the memory access request is a store request, the snoop controller 6 initiates the memory access process in which the snoop controller 6 stores the target data in the main memory 3.

Specifically, the snoop controller 6 determines, based on the address included in the store request and based on the address space assigned in the main memory 3, whether the main memory 3 that is to store the target data corresponding to the store request is managed by the system controller SC to which the snoop controller 6 belongs. If the main memory 3 that is to store the target data corresponding to the store request is managed by the system controller SC to which the snoop controller 6 belongs, the snoop controller 6 initiates the memory access process so as to store the target data contained in the store request in the main memory 3.

Further, the snoop controller 6 changes the register format of the cache-line state information of the cache manage table 9 in accordance with the data transfer performed by the memory access process to update the register format. Hereinafter, the register format registered in the cache-line state information in the cache manage table 9 and its transition condition are explained with reference to FIG. 5 and FIG. 6.

MOESI protocol is explained below as an example of cache protocol. In MOESI protocol, each cache line is in one of five states, namely, updated and exclusive (M), owned (O), non-updated and exclusive (E), shared (S), and invalid (I). The invalid (I) state indicates that the cache line does not store a valid state. The updated and exclusive (M) state indicates that the data stored in the cache line is updated, and indicates that the cache line of other cache memories 11 and the main memory 3 stores no copy of the data. The non-updated and exclusive (E) state indicates that the data stored in the cache line is unchanged, and indicates that cache line of the other cache memory 11 stores no copy of the data. The shared (S) state indicates that the data stored in the cache line 11 is unchanged, and indicates that the cache line of the other cache memory 11 stores copy of the data. The owned (O) state indicates that the data stored in the cache line is changed, and indicates that it is the owner which writes data into the main memory during write-back.

When data is transferred from the main memory 3 to the cache line in response to a fetch request, that is, when data is copied to the cache line from the main memory 3, the state of the cache line is changed from invalid (I) to non-updated and exclusive (E). When data is transferred from other cache memory 11 to the cache line in response to a fetch request, that is, when data is copied to the cache memory 11 from other cache memory 11, the state of the cache memory 11 is changed from invalid (I) to shared (S). When data is copied to the cache line from other cache memory 11 or the main memory 3 and the data thus copied is changed in response to memory access request in the form of a store request, the state of the cache line is changed from invalid (I) to updated and exclusive (M). When data is transferred from a cache line of other cache memory 11 having the register format of shared (S) or owned (O) in response to a fetch request, and in addition, when the cache memory 11 is physically closer to the main memory 3 that is to store the transferred data than the cache memory 11 that has data stored in the owned (O) state prior to the data transfer, the state of the cache memory 11 is changed from invalid (I) to owned (O).

When data in the cache line is changed in response to a store request, the state of the cache line is changed from non-updated and exclusive (E) to updated and exclusive (M). When data is transferred to other cache memory 11 in response to a fetch request, the state of the cache line is changed from non-updated and exclusive (E) to shared (S). When the cache line is discarded, the state is changed from non-updated and exclusive (E) to invalid (I).

When data in the cache line is changed in response to a store request, the state of the cache line is changed from shared (S) to updated and exclusive (M). When data identical to that stored in the cache line of the cache memory 11 but stored in a cache line of other cache memory 11 is changed in response to a store request, the state of the cache line is changed from shared (S) to invalid (I). When data identical to the data stored in the cache memory 11 is changed in other cache memory 11 in response to a store request, the state of the cache memory 11 is changed from shared (S) to invalid (I).

When data is transferred to other cache memory 11 in response to a fetch request, and when the transfer source cache memory 11 is physically closer to the main memory 3 than the transfer destination cache memory 11, the state of the cache line is changed from updated and exclusive (M) to owned (O). When data is discarded from the cache line, the state of the cache line is changed from updated and exclusive (M) to invalid (I). When data is transferred to other cache memory 11 in response to a fetch request, the state of the cache line is changed from updated and exclusive (M) to shared (S).

When data is discarded from the cache line, the state of the cache line is changed from owned (O) to invalid (I). When the data in the cache line is changed in response to a store request, the state of the cache line is changed from owned (O) to updated and exclusive (M). When data is transferred to other cache memory 11 in response to a fetch request, and the transfer source cache memory 11 is physically farther from the main memory 3 than the cache memory 11 to the transfer destination cache memory 11, the state of the cache line is changed from owned (O) to shared (S).

The physical distance from the main memory 3 corresponds to the route length of the bus used for the data transfer. When the main memory 3 that is to store the data of the cache line and the CPU 1 having the cache memory 11 with the cache line are provided on the same system board SB0 to SB7, or in other words, when it is unnecessary to use either of the cross bars XB0 and XB1 during write-back, the CPU 1 is considered physically closest to the main memory 3. The CPU 1 that is next physically closest to the main memory 3 is one that uses either one of the cross bar XB0 and the cross bar XB1. The CPU 1 that uses both of the cross bars XB0 and XB1 is considered physically farthest from the main memory 3. The information processing apparatus can be configured such that one CPU 1 is selected in a predetermined sequence if the status of both the cache memory 11a of the CPU 1a and the cache memory 11b of the CPU 1b belonging to the same system board SB0 to SB7 is 'HIT.'

The CPU-request issuing unit 7 controls access to the cache memory 11 in the CPU 1 by the memory access process initiated by the snoop controller 6. The MS-access issuing unit 8 controls access to the main memory 3 by the memory access process initiated by the snoop controller 6.

The functioning of the information processing apparatus according to the present embodiment in response to the memory access request issued by the CPU 1a of the system board SB0 is described below with reference to FIGS. 1 to 12.

Upon receiving a memory access request issued by the CPU 1a of the system board SB0, the memory-access-request receiver 4 of the system controller SC of the system board SB0 outputs the received memory access request to the broadcast transceiver 5. The broadcast transceiver 5 outputs the memory access request to the snoop controller 6. Here, the output memory access request contains a physical number that is pre-assigned to the system board SB0. Further, the broadcast transceiver 5 transmits the memory access request associated with the physical number to all the broadcast transceivers 5 of the system controllers SC of the system boards SB1 to SB7.

Each of the broadcast transceivers 5 of the system controllers SC of the system boards SB1 to SB7 outputs the received memory access request with the physical number to the snoop controller 6 of the respective system controllers SC of the respective system boards SB1 to SB7.

Each snoop controller 6 of the system controller SC of the system boards SB0 to SB7 detects the cache line state of the cache memory 11 of the CPU 1 managed by the system controller SC to which the snoop controller 6 belongs and the resource status used for data transfer, and performs the snoop process. In the snoop process, the snoop controller 6 selects the states of the cache memories 11.

When the snoop process is performed, each snoop controller 6 of the system controller SC of the system boards SB0 to SB7 notifies the snoop process result to other snoop controllers 6. Here, the snoop process result includes a cache memory ID that identifies the cache memory, the status of the cache memory 11 indicated by the cache memory ID, and the physical number of the system boards SB0 to SB7 to which the snoop controller 6 belongs. If the status is 'HIT,' the snoop controller 6 also includes the register format in the snoop process result.

Each of the snoop controllers 6 of the system controllers SC of the system boards SB0 to SB7 merges the status selected by itself as well the statuses notified by other snoop controllers 6, and selects a final status. If the final status is 'BUSY,' the snoop controller 6 repeats the snoop process until the final status becomes 'HIT' or 'MISS.' If the final status is 'HIT,' the snoop controller 6 initiates the memory access process in which the snoop controller 6 requests data transfer for one of the cache memories 11 with a 'HIT' status, and updates the register format of the concerned cache memory 11.

If the final status is 'MISS,' and if the memory access request is a fetch request, the snoop controller 6 initiates the memory access process in which the snoop controller 6 requests reading the target data from the main memory 3, and updates the register format in the cache memory 11.

If the final status is 'MISS,' and if the memory access request is a store request, the snoop controller 6 initiates the memory access process in which the snoop controller 6 requests for storing target data in the main memory 3.

Hereinafter, a selecting operation of the cache memory 11 which is to be a transfer source of the data transfer when the final state is 'HIT' is described with reference to FIGS. 7A and 7B. Here, a cache memory with 'HIT' state becomes a transfer source when the snoop process result detects only one 'HIT' state. Hence, in the following, a situation when a plurality of states becomes 'HIT' is described.

Figure 7A:
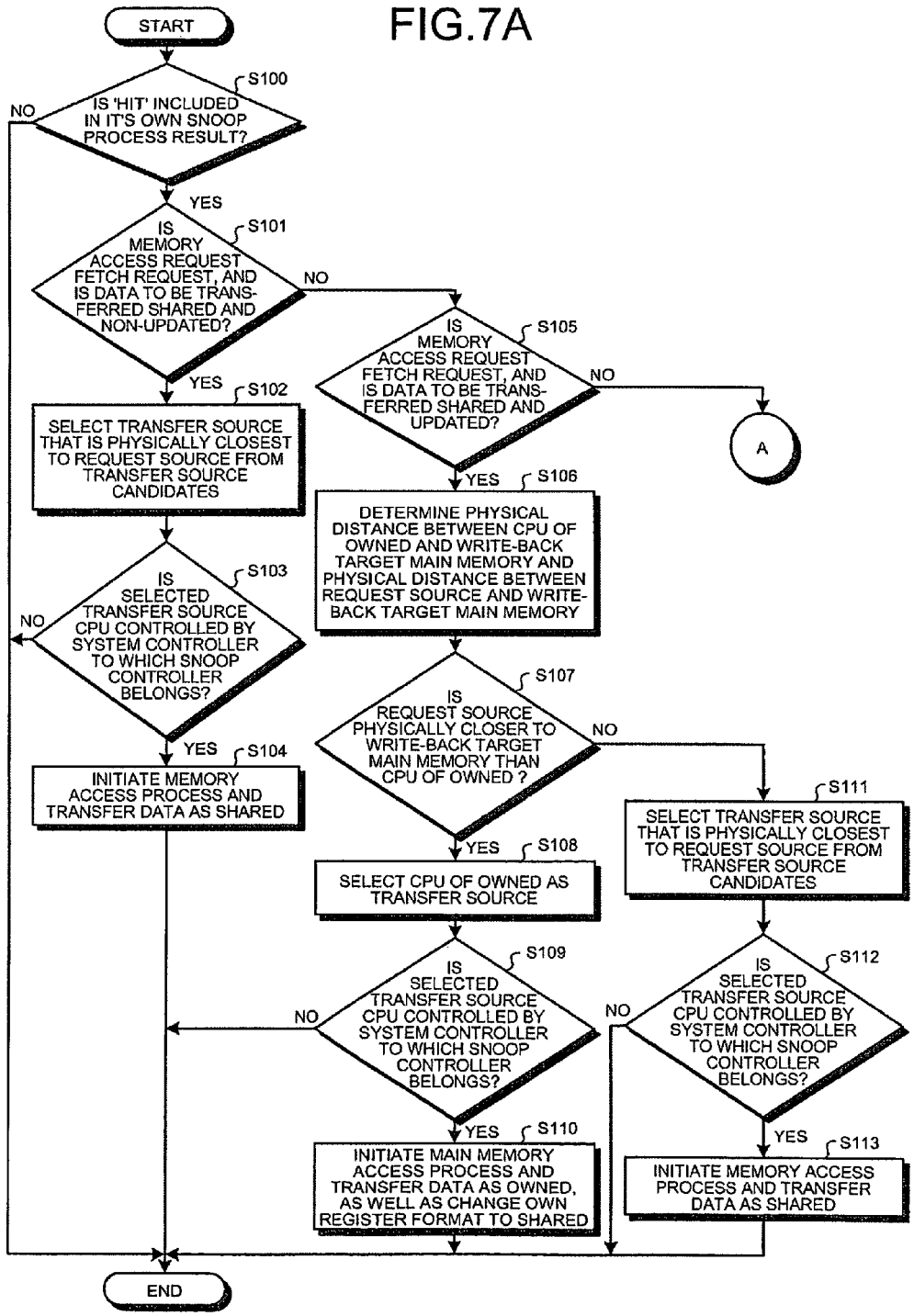
FIG. 7A is a flowchart of an operation of the information processing apparatus according to the embodiment.

The snoop controller 6 of the system controller SC of each system board SB0 to SB7 determines whether its own snoop process result includes a 'HIT' state (Step S100 of FIG. 7A). If its own snoop process result does not include 'HIT' state, the process is ended because the cache memory 11 is not deemed as the source cache memory. If its own snoop process result includes 'HIT' state, the snoop controller 6 determines whether the memory access request with the physical number attached is a fetch request and, in addition, determines whether the data to be transferred is shared and non-updated. That is to say, the snoop controller 6 determines whether the memory access request with the physical number attached is a fetch request and, in addition, determines whether the register format of the cache memories 11 with a 'HIT' are all shared (S) (Step S101 of FIG. 7A).

When the memory access request with the physical number attached is a fetch request and, in addition, when the data to be transferred is shared and non-updated (Yes at Step S101 of FIG. 7A), each snoop controller 6 selects as a transfer source one of transfer source candidates based on the physical number associated to the memory access request and the physical number contained in the snoop process result (Step S102 of FIG. 7A). Specifically, let the snoop controller 6 preliminarily store the physical distance between each pair of physical numbers in the form of numerical values, and extracts the numerical value corresponding to the physical number attached to the memory access request and the physical numbers attached to the snoop process result. Then, one of the transfer source candidates having the smallest extracted value is selected as the transfer source. Here, each transfer source candidate corresponds to each CPU 1 each of which having cache memory 11 with the snoop process result of 'HIT.' Further, the one of the transfer source candidate CPUs that is selected as the transfer source is physically closest to a CPU 1 (request source) that has issued the memory access request, among the transfer source candidates CPU.

Then, each snoop controller 6 determines whether the transfer source CPU 1 is controlled by the system controller SC to which the snoop controller 6 belongs (Step S103 of FIG. 7A). If not (No at Step S103 of FIG. 7A), the snoop controller 6 ends the process. If the transfer source CPU 1 is the CPU 1 controlled by the system controller SC to which the snoop controller 6 belongs (Yes at Step S103 of FIG. 7A), the snoop controller 6 outputs an access request via the CPU-request issuing unit 7 to read the data from the cache memory 11 of the selected CPU 1, reads the data, and transmits to the request source a response including the data as well as an indication that the register format of the data be changed to shared (S) (Step S104 of FIG. 7A). The request source CPU 1 stores the data included in the response in the cache line and sets shared (S) in the cache-line state information corresponding to the cache line ID of the respective cache line.

Figure 8:
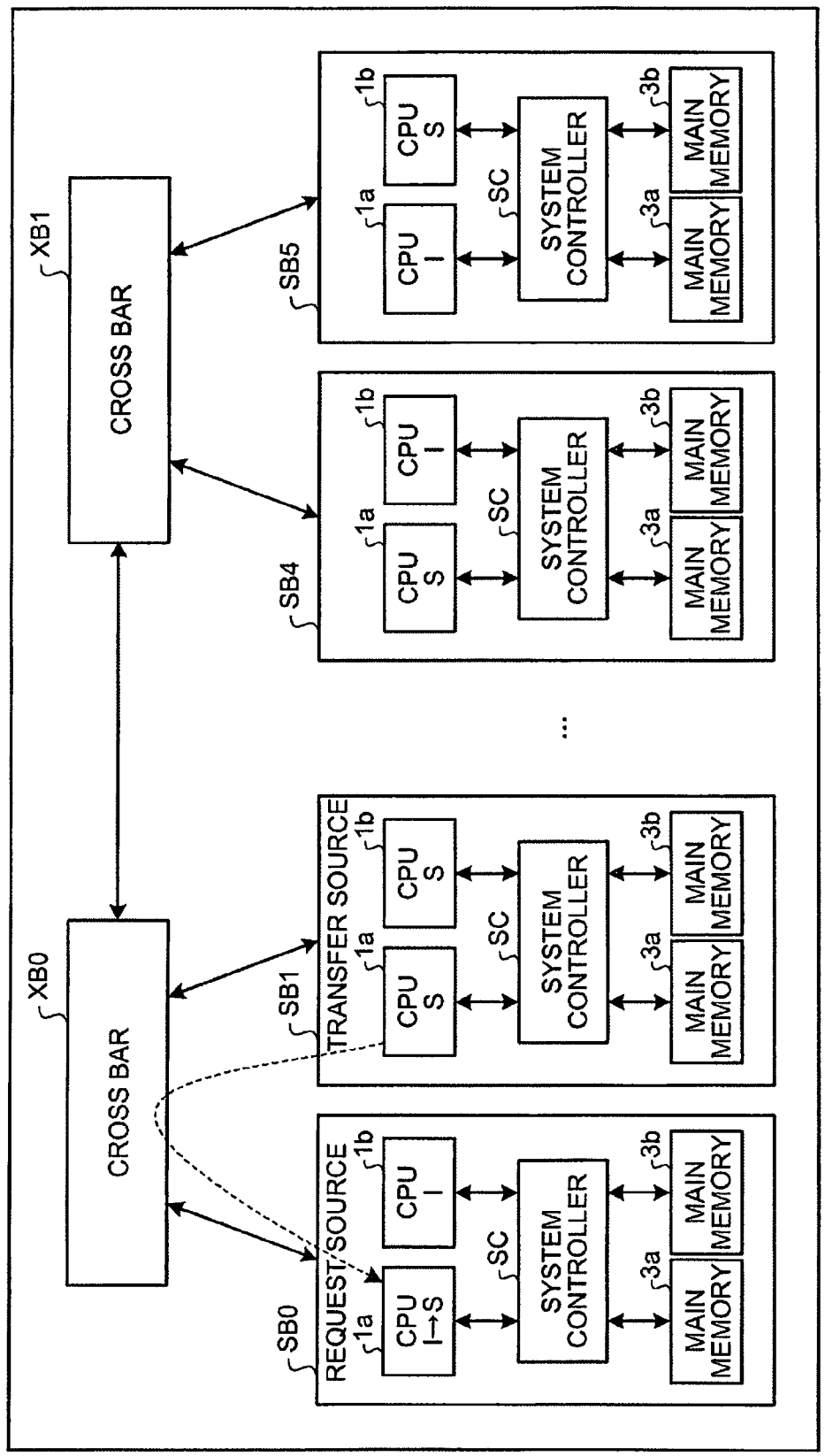
FIG. 8 is a schematic diagram for explaining the operation of the information processing apparatus according to the embodiment.

For example, as shown in FIG. 8, if the register format of the CPUs 1a and 1b of the system board SB1, the CPU 1a of the system board SB4, and CPU 1b of the system board SB5 is shared (S), the snoop controller 6 selects the CPU 1a of the system board SB1, which is physically closest to the request source CPU 1a of the system board SB0, as the transfer source. Accordingly, the CPU 1a of the system board SB1 transmits the data to the CPU 1a of the system board SB0, and the register format of the cache line of the cache memory 11a of the CPU 1a of the system board SB0 is changed from invalid (I) to shared (S).

If the memory access request with the physical number attached is a fetch request and, in addition, the data to be transferred is not shared and non-updated (No at Step S101 of FIG. 7A), each snoop controller 6 determines whether the memory access request with the physical number attached is a fetch request, and in addition, whether the data to be transferred is shared and updated. That is to say, the snoop controller 6 determines whether the memory access request with the physical number attached is a fetch request, and in addition, whether the register format of the cache memories 11 with a 'HIT' in the snoop process result includes shared (S) and owned (O) (Step S105 of FIG. 7A). If so (Yes at step S105 of FIG. 7A), each snoop controller 6 determines a physical distance between the CPU 1 having the cache memory 11 with the register format of owned (O) and the main memory 3 that is to store the data during the write-back (write-back target main memory) as well as a distance between the request source CPU 1 and the write-back target main memory 3 (Step S106 of FIG. 7A).

Specifically, for example, relationship between an address space in each of the main memories 3 provided on each of the system boards SB0 to SB7 and each of the system boards SB0 to SB7 is preliminarily registered in the snoop controller 6. Then, the snoop controller 6 recognizes a physical number of the write-back target main memory based on the aforementioned relationship and an address contained in the memory access request. Subsequently, as similar to the aforementioned physical distance calculation between the CPUs 1, a physical distance between the CPU 1 having the register format of owned (O) and the main memory 3 (write-back target main memory) that stores the data during write-back is determined, and further, a physical distance between the request source CPU 1 and the write-back target main memory is determined.

Each snoop controller 6 determines whether the request source CPU 1 is physically closer to the write-back target main memory than the CPU 1 having the cache memory 11 with the register format of owned (O) (Step S107 of FIG. 7A). If so (Yes at Step S107 of FIG. 7A), each snoop controller 6 selects the CPU 1 having the cache memory 11 with the register format of owned (O) as the transfer source CPU 1 (Step S108 of FIG. 7A)

Each snoop controller 6 then determines whether the transfer source CPU 1 is controlled by the system controller SC to which the snoop controller 6 belongs (Step S109 of FIG. 7A). If not (No at Step S109 of FIG. 7A), the snoop controller 6 ends the process. If the transfer source CPU 1 is controlled by the system controller SC to which the snoop controller 6 belongs (Yes at Step S109 of FIG. 7A), the snoop controller 6 outputs an access request via the CPU-request issuing unit 7 to read the data from the cache memory 11 of the selected CPU 1. Then, the snoop controller 6 transmits to the request source a response that includes the read data as well as an indication that the register format of the data be changed to owned (O), and in addition, changes the register format corresponding to the cache line ID of the concerned cache line in the cache-line state information of the cache control table 9 from owned (O) to shared (S) (Step S110 of FIG. 7A). The request source CPU 1 stores the data included in the response in the cache line of the cache memory 11a, and sets owned (O) in the cache-line state information corresponding to the cache line ID of the concerned cache line.

Figure 9:
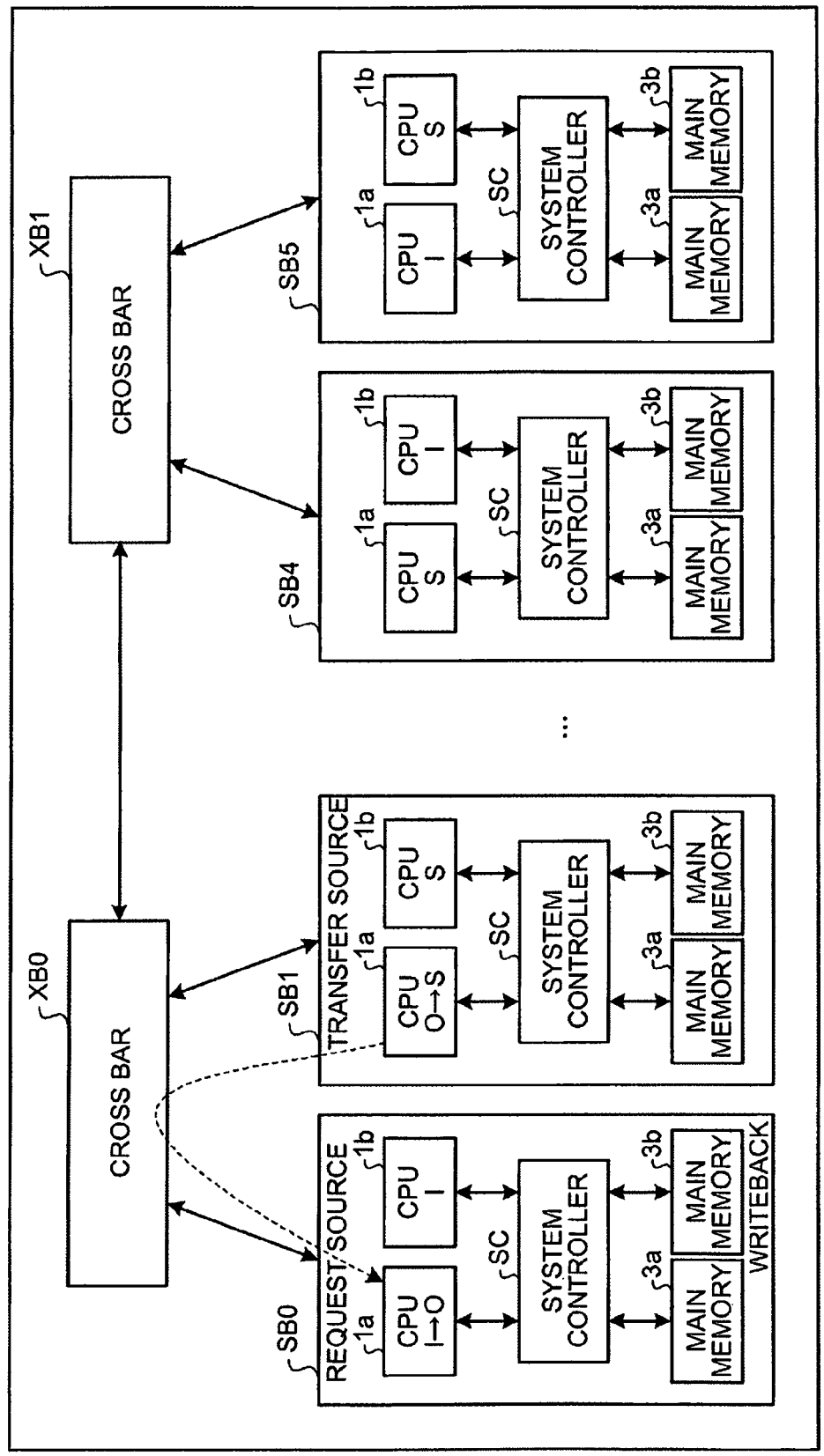
FIG. 9 is a schematic diagram for explaining the operation of the information processing apparatus according to the embodiment.

For example, as shown in FIG. 9, when the register format of the CPU 1a of the system board SB1 is owned (O), when the register format of the CPU 1b of the system board SB1, the CPU 1a of the system board SB4, and CPU 1b of the system board SB5 is shared (S), and when the main memory 3b of the system board SB0 is the write-back target main memory, a physical distance between the request source CPU 1a of the system board SB0 and the main memory 3b is less than the physical distance between the CPU 1a of the system board SB1 with the register format of 'owned' and the main memory 3b. Therefore, the CPU 1a of the system board SB1 with the register format of 'owned' is selected as the transfer source. Accordingly, the CUP 1a of the system board SB1 transfers data to the CPU 1a of the system board SB0. Further, the register format the cache line of the cache memory 11a of the CPU 1a of the system board SB1 is changed from 'owned (O)' to 'shared(S),' and the register format of the cache line of the cache memory 11a of the CPU 1a of the system board SB0 is changed from 'invalid (I)' to 'owned (O).' Consequently, the data with the register format of 'owned (O)' is provided in the system board SB0 on which the main memory 3a that is to store the data during the write-back is provided. Hence, the data can be stored in the main memory 3a during the write-back without transferring the data through the bus and the cross bars XB0 and XB1.

If the request source CPU 1 is physically farther from the write-back target main memory than the CPU 1 having the cache memory 11 with the register format of owned (O) (No at Step S107 of FIG. 7A), the snoop controller 6 of the system controller SC of the system board SB0 selects the transfer source which is physically closest to the request source from all the transfer source candidates (Step S111 of FIG. 7A).

Each snoop controller 6 of the system controller SC of the system boards SB0 to SB7 determines whether the CPU 1 selected as the transfer source is controlled by the system controller SC to which the snoop controller 6 belongs (Step S112 of FIG. 7A). If so (Yes at Step S112 of FIG. 7A), the snoop controller 6 outputs an access request via the CPU-request issuing unit 7 to read the data from the cache memory 11 of the selected CPU 1, reads the data, and transmits a response that includes the data as well as an indication that the register format of the data be changed to shared (S) (Step S113 of FIG. 7A). The request source CPU 1 stores in the cache line the data included in the response, and sets shared (S) in the cache-line state information corresponding to the cache line ID of the concerned cache line.

Figure 10:
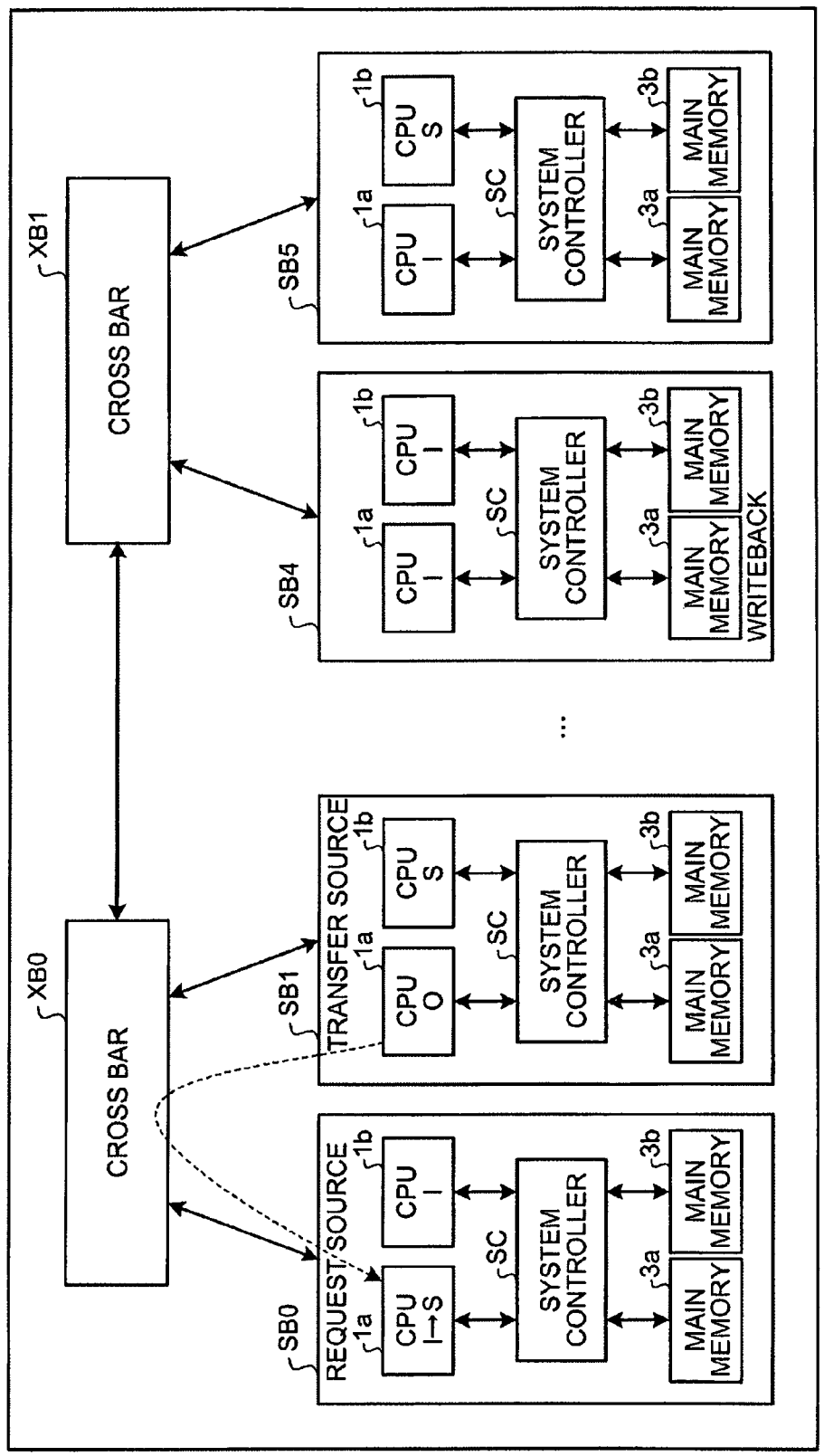
FIG. 10 is a schematic diagram for explaining the operation of the information processing apparatus according to the embodiment.

For example, as shown in FIG. 10, if the register format of the CPU 1a of the system board SB1 is owned (O), if the register format of the CPU 1b of the system board SB4 if the CPU 1b of the system board SB5 is shared (S), and if the main memory 3a of the system board SB4 is the write-back target main memory, the CPU 1 of the system board SB1 is physically closer to the main memory 3a of the system board SB4 than the request source CPU 1a of the system board SB0. Further, the CPU 1a of the system board SB1 is physically closer to the request source CPU 1a of the system board SB0 than the CPU 1b of the system board SB1 and the CPU 1a of the system board SB5. Thus, the snoop controller 6 selects the CPU 1a having a register format of owned (O) of the system board SB1 as the transfer source, whereupon the CPU 1a of the system board SB1 transmits the data to the CPU 1a of the system board SB0, upon which the register format of the cache line of the cache memory 11a of the CPU 1a of the system board SB0 is changed from invalid (I) to shared (S). In other words, the register format of the CPU 1a of the system board SB1 remains unchanged as owned (O).

If the memory access request with the physical number attached is a fetch request, and the data to be transferred is not shared and updated (No at Step S105 of FIG. 7A), each snoop controller 6 determines whether the memory access request is a store request, and the data to be transferred is shared and updated. That is to say, the snoop controller 6 determines whether the memory access request with the physical number attached is a fetch request, and whether shared (S) and owned (O) is included in the register format of the CPU 1 that is associated with 'HIT' state as the snoop process result (Step S114 of FIG. 7B).

Figure 7B:
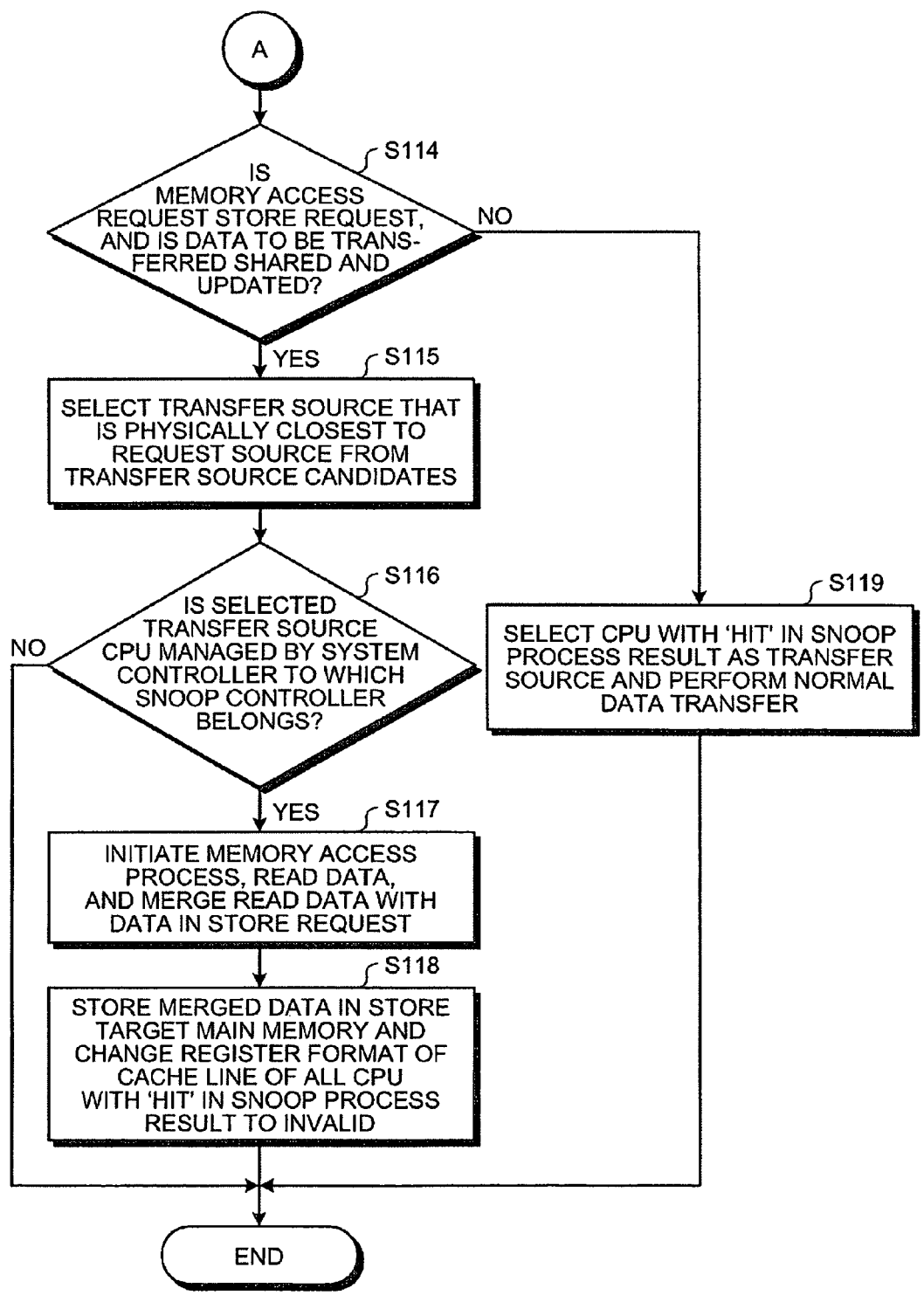
FIG. 7B is a flowchart of the operation of the information processing apparatus according to the embodiment.

If the memory access request with the physical number attached is a store request (Yes at Step S114 of FIG. 7B), and the data to be transferred is shared and updated, each snoop controller 6 selects the CPU 1 that is physically closest to the main memory 3 into which data is to be stored from the transfer source candidates (Step S115 of FIG. 7B). If the transfer source CPU 1 is controlled by the system controller SC to which the snoop controller 6 belongs (Yes at Step S116), the snoop controller 6 outputs an access request via the CPU-request issuing unit 7 to read the data from the cache memory 11 of the selected CPU 1, reads the data, and merges the data read from the cache memory 11 and the data included in the store request (Step S117 of FIG. 7B). Specifically, the snoop controller 6 overwrites the data in the store request with the data read from the cache memory 11 corresponding to the address in the store request.

The snoop controller 6 stores the merged data in the destination main memory 3 and sends a notification to all the CPUs 1 with snoop process result of 'HIT' to change the register format of the corresponding cache line to invalid (I) (Step S118 of FIG. 7B). Specifically, if the destination main memory 3 is controlled by the system controller SC to which the snoop controller 6 belongs, the snoop controller 6 initiates the memory access process via the MS-access issuing unit 8 to store the merged data in the destination main memory 3. In addition, the snoop controller 6 changes the register format in the cache-line state information corresponding to the cache line ID of the corresponding cache line in the cache control table 9 to invalid (I), and sends the notification to all the CPUs 1 with the snoop process result of 'HIT' to change the register format of the corresponding cache line to invalid (I).

If the destination main memory 3 is not controlled by the system controller SC to which the snoop controller 6 belongs, the snoop controller 6 selects as the request source the system controller SC of the system board SB0 to SB7 that includes the destination main memory 3, transmits the merged data to the selected system controller SC, and let the system controller SC store the data in the destination main memory 3. The snoop controller 6 then changes the register format in the cache-line state information corresponding to the cache line ID of the corresponding cache line in the cache control table 9 to invalid (I), and sends the notification to all the CPUs 1 with the snoop process result of 'HIT' to change the register format of the concerned cache line to invalid (I).

Figure 11:
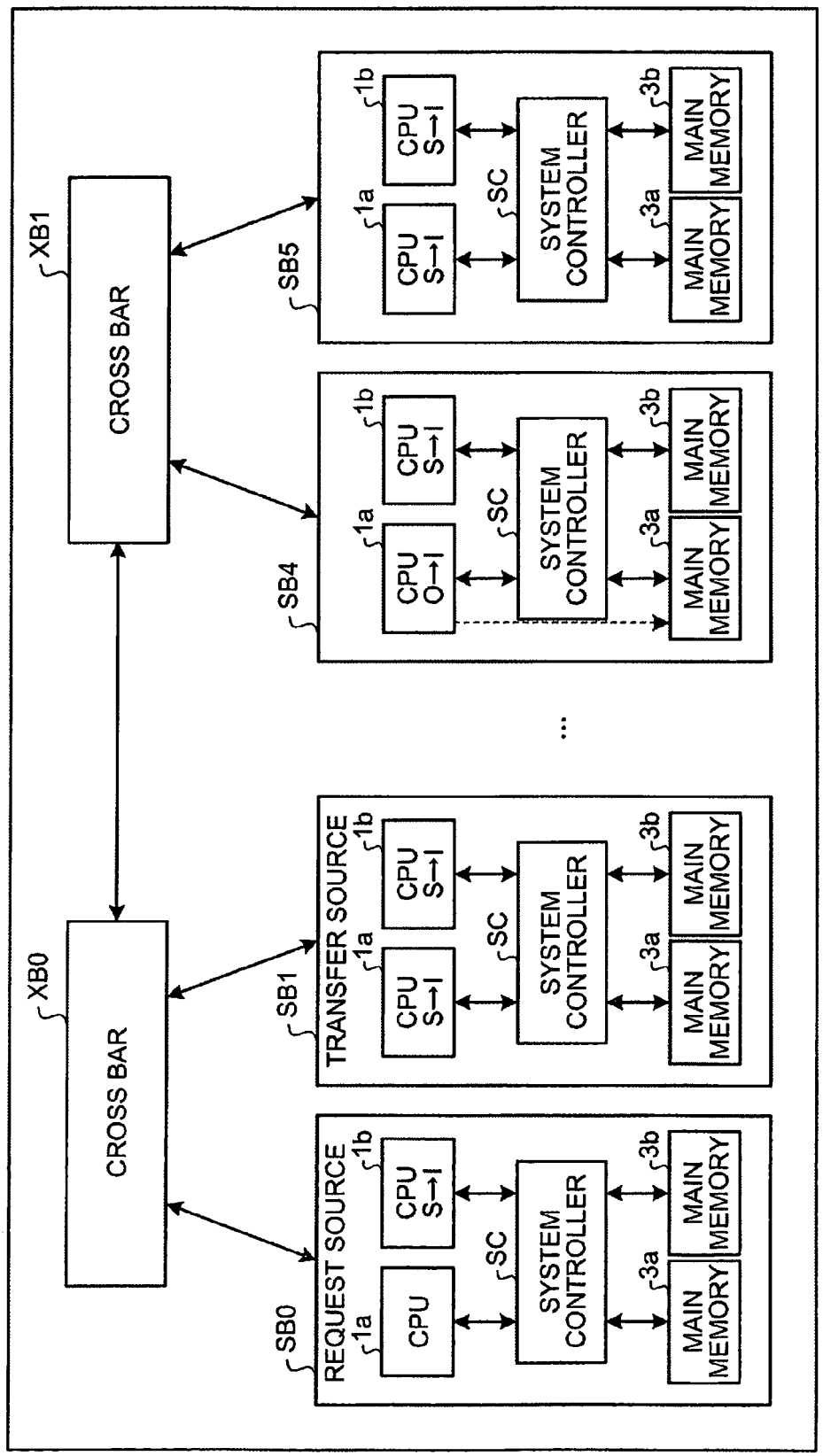
FIG. 11 is schematic diagram for explaining the operation of the information processing apparatus according to the embodiment.

For example, as shown in FIG. 11, if the register format of the CPU 1b of the system board SB0, the CPUs 1a and 1b of the system board SB1, the CPU 1b of the system board SB4, and the CPUs 1a and 1b of the system board SB5 are shared (S), the register format of the CPU 1a of the system board SB4 is owned (O), and in addition, the main memory 3a of the system board SB4 is the destination main memory, the CPU 1a of the system board SB4 is physically closest to the destination main memory 3a of the system board SB4. Thus, the snoop controller 6 of the system controller SC of the system board SB4 merges the data read from the CPU 1a of the system board SB4 and the data in the store request, and stores the merged data in the main memory 3a of the system board SB4 without using the bus or either of the cross bars XB0 and XB1. Then, the snoop controller 6 changes the register formats of the CPU 1b of the system board SB0, the CPUs 1a and 1b of the system board SB1, the CPU 1b of the system board SB4, and the CPUs 1a and 1b of the system board SB5 from shared (S) to invalid (I).

Figure 12:
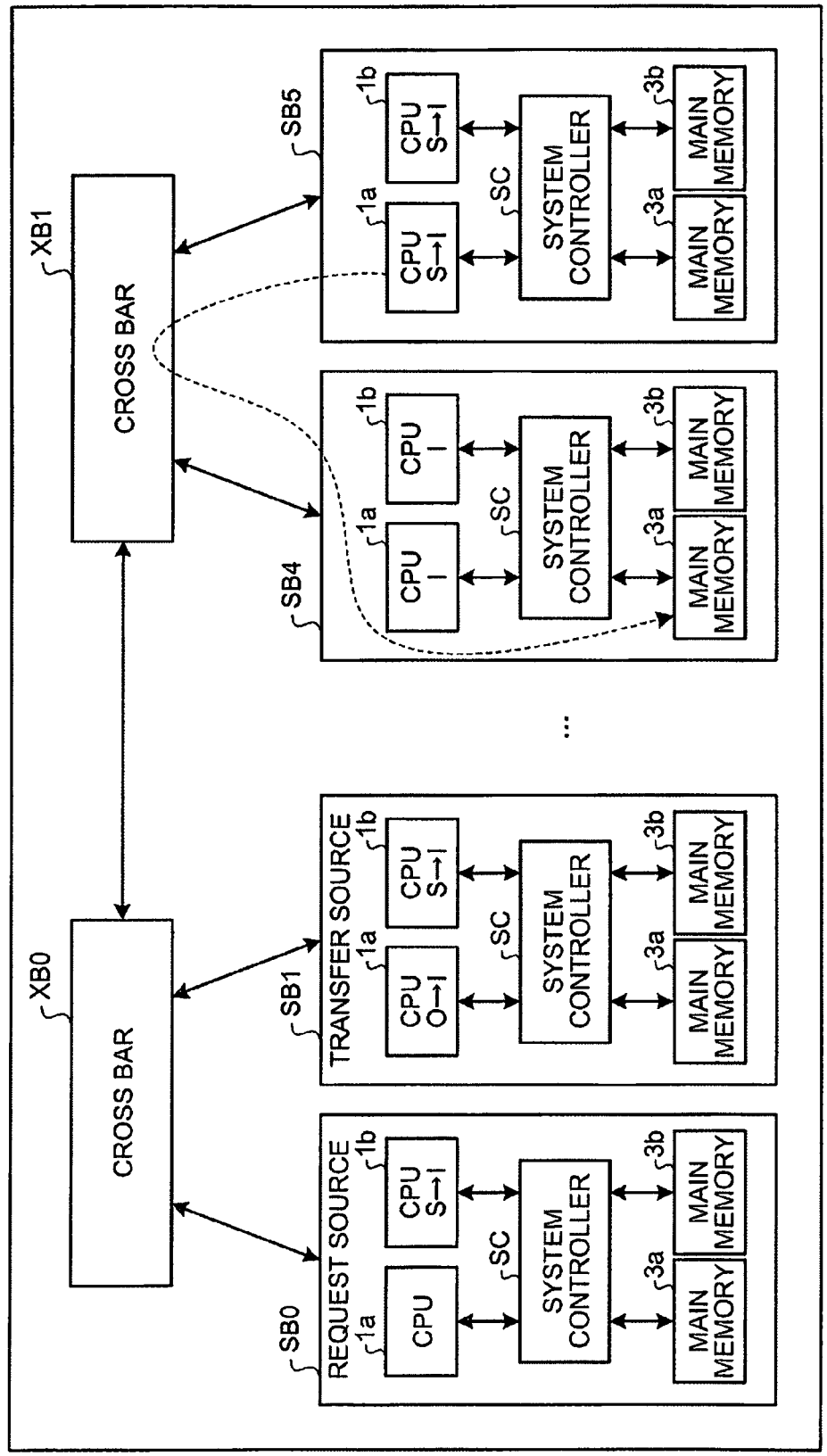
FIG. 12 is a schematic diagram for explaining the operation of the information processing apparatus according to the embodiment.

As shown in FIG. 12, if the register format of the CPU 1b of the system board SB0, the CPU 1a and 1b of the system board SB1, CPU 1b of the system board SB4, and the CPUs 1a and 1b of the system board SB5 are shared (S), and the register format of the CPU 1a of the system board SB1 is owned (O), and in addition, the main memory 3a of the system board SB4 stores the data in response to the store request, the CPU 1a of the system board SB5 is physically closest to the main memory 3a of the system board SB4. Thus, the snoop controller 6 of the system controller SC of the system board SB5 reads the data from the CPU 1a of the system board SB5, merges the data with the data in the store request, stores the merged data in the main memory 3a of the system board SB4, causing the CPU 1b of the system board SB0, the CPU 1b of the system board SB1, and the CPUs 1a and 1b of the system board SB5 to change the register format of the corresponding cache line from shared (S) to invalid (I) via the bus, the cross bar SB1, and the system controller SC of the system board SB4.

If the memory access request with the physical number attached is a store request, and the data to be transferred is not shared and updated (No at Step S114 of FIG. 7B), each snoop controller 6 selects the CPU 1 with the snoop process result of 'HIT,' performs data transfer normally, and changes the register format according to the data transfer (Step S119 of FIG. 7B), that is, each snoop controller 6 carries out the data transfer process according to the conventional MOESI protocol.

As described above, according to the embodiment of the present invention, when a data requested by a memory access request is available in a plurality of cache memories, a transfer source CPU is selected from transfer source candidate CPUs each of which having a cache memory including the data. Here, the transfer source CPU is selected from one of a transfer source candidate CPU that is physically closest to a request source CPU issuing the memory access request among the transfer source candidate CPUs and a transfer source candidate CPU that is physically closest to a write-back target main memory that stores the data during write-back among the transfer source candidate CPUs, based on a type of the memory access request and based on a register format indicating a data state of each cache memory. Then, the data is transferred, and the register format is shifted in accordance with a physical distance between the request source CPU and the write-back target main memory and a physical distance between the transfer source CPU and the write-back target main memory. Consequently, a bus can efficiently be used during a data transfer.

According to the embodiment, when the memory access request is a fetch request, and the data to be transferred is shared and updated, and the request source CPU is physically closer to the write-back target main memory than the transfer source CPU, the register format of the cache memory of the request source CPU is changed to owned (O), so that the cache memory containing the data which will be stored in the write-back target main memory during the write back is physically closer to the write-back target main memory. Consequently, efficient use of the bus can be made during data transfer.

According to the embodiment, if the memory access request is a store request, and the data to be transferred is shared and updated, the CPU that is physically closest to the write-back target main memory is selected as the transfer source CPU from among the transfer source candidates. Consequently, efficient use of the bus can be made during data transfer.

MOESI protocol has been used to preserve cache coherency in the present embodiment. However, any cache protocol that includes owned (O) and shared (S) state as the register format can be used.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a plurality of system boards connected via a bus,
each of the system boards comprising
  a plurality of processors each including a cache memory and issuing a memory request,
  a main memory that forms a shared memory shared by the processors, and
  a system controller that controls a data transfer between one of the cache memory and the main memory based on the memory access request, selects a transfer source processor from transfer source candidate processors each having a cache memory with a cache status of owned that stores data requested by the memory access request when the requested data is available and a request source processor issuing the memory access request is closer to a write-back target main memory than the transfer source candidate processors, transfers the requested data, and changes the cache status of the cache memory of the transfer source processor to shared as well as changes the cache status of the cache memory of the request source processor to owned,
wherein the system controller determines the physical distance between a transfer source candidate processor having the cache memory with the cache status of owned among the transfer source candidate processors and the write-back target main memory as well as determines the physical distance between the request source processor and the write-back target main memory when the memory access request is a fetch request.

2. An information processing apparatus comprising:
a plurality of system boards connected via a bus,
each of the system boards comprising
  a plurality of processors each including a cache memory and issuing a memory request,
  a main memory that forms a shared memory shared by the processors, and
  a system controller that controls a data transfer of at least one of the cache memory and the main memory based on the memory access request, selects a transfer source processor closest to a write-back target main memory among transfer source candidate processors each having a cache memory storing data requested by the memory access request when the data is available and the memory access request is a store request, transfers the requested data, and changes a cache status indicating a data state of respective cache memory storing the data, wherein the system controller reads the data from the cache memory of the transfer source processor, merges the data included in the store request and the data read from the cache memory of the transfer source processor, and stores the merged data in the write-back target main memory as well as changes the cache status of the cache memory of the transfer source processor to invalid.

3. A data transfer method applied to an information processing apparatus having a plurality of system boards connected via a bus, each of the system boards including a plurality of processors each having a cache memory and issuing a memory access request, a main memory that forms a shared memory shared by the processors, and a system controller that controls a data transfer between one of the cache memory and the main memory based on the memory access request, the data transfer method comprising:

selecting, by the system controller, a transfer source processor from transfer source candidates processors each having a cache memory with a cache status of owned that stores data requested by the memory access request when the requested data is available and a request source processor issuing the memory access request is closer to a write-back target main memory than the transfer source candidate processors;

transferring, by the system controller, the requested data; and changing, by the system controller, the cache status of the cache memory of the transfer source processor to shared as well as changing the cache status of the cache memory of the request source processor to owned, wherein the system controller determines the physical distance between a transfer source candidate processor having the cache memory with the cache status of owned among the transfer source candidate processors and the write-back target main memory as well as determines the physical distance between the request source processor and the write-back target main memory when the memory access request is a fetch request.

4. A data transfer method applied to an information processing apparatus having a plurality of system boards connected via a bus, each of the system boards including a plurality of processors each having a cache memory and issuing a memory access request, a main memory that forms a shared memory shared by the processors, and a system controller that controls a data transfer between one of the cache memory and the main memory based on the memory access request, the data transfer method comprising:

selecting, by the system controller, a transfer source processor closest to a write-back target main memory among transfer source candidate processors each having a cache memory storing data requested by the memory access request when the data is available and the memory access request is a store request;

transferring, by the system controller, the requested data; and changing, by the system controller, a cache status indicating a data state of respective cache memory storing the data, wherein the system controller reads the data from the cache memory of the transfer source processor, merges the data included in the store request and the data read from the cache memory of the transfer source processor, and stores the merged data in the write-back target main memory as well as changes the cache status of the cache memory of the transfer source processor to invalid.

* * * * *